United States Patent
Shimonomoto et al.

(10) Patent No.: US 6,965,295 B2
(45) Date of Patent: Nov. 15, 2005

(54) ELECTRONIC KEY SYSTEM OPERABLE WITH CHARGE CAPACITOR POWER

(75) Inventors: Ifushi Shimonomoto, Okazaki (JP); Takahide Kitahara, Kariya (JP)

(73) Assignee: Denso Corporation, Kariya (JP)

( * ) Notice: Subject to any disclaimer, the term of this patent is extended or adjusted under 35 U.S.C. 154(b) by 264 days.

(21) Appl. No.: 10/430,286

(22) Filed: May 7, 2003

(65) Prior Publication Data

US 2003/0222756 A1    Dec. 4, 2003

(30) Foreign Application Priority Data

May 31, 2002   (JP)   .............................. 2002-158883

(51) Int. Cl.⁷ .......................... H04Q 9/00; H04Q 5/22; B60R 25/00
(52) U.S. Cl. .................. 340/5.61; 340/5.71; 340/10.34
(58) Field of Search .............................. 340/5.61, 5.72, 340/10.34

(56) References Cited

U.S. PATENT DOCUMENTS

| | | |
|---|---|---|
| 4,868,409 A | 9/1989 | Tanaka et al. |
| 5,307,658 A | 5/1994 | Kokubu et al. |
| 5,745,026 A * | 4/1998 | Kokubu et al. ........ 340/286.01 |
| 6,011,320 A | 1/2000 | Miyamoto et al. |
| 6,323,566 B1 * | 11/2001 | Meier ....................... 307/10.2 |

FOREIGN PATENT DOCUMENTS

| | | |
|---|---|---|
| JP | A-H07-69173 | 3/1995 |
| JP | A-H07-150835 | 6/1995 |
| JP | A-H11-59332 | 3/1999 |
| JP | A-2000-59271 | 2/2000 |

* cited by examiner

Primary Examiner—Michael Horabik
Assistant Examiner—Scott Au
(74) Attorney, Agent, or Firm—Posz Law Group, PLC

(57) ABSTRACT

An electronic key system has a portable electronic key and a transmitter provided in a vehicle. The key and the transmitter have respective LC resonance circuits including antenna coils that can be electromagnetically coupled. The portable device has a charge capacitor and a diode. The capacitor is charged with a voltage induced by the coil when the LC resonance circuit resonates. The electronic key is enabled to communicate with the transmitter with the charged voltage of the charge capacitor when a built-in battery runs down.

8 Claims, 2 Drawing Sheets

ELECTRONIC KEY SYSTEM OPERABLE WITH CHARGE CAPACITOR POWER

CROSS REFERENCE TO RELATED APPLICATION

This application is based on and incorporates herein by reference Japanese patent application No. 2002-158883 filed on May 31, 2002.

FIELD OF THE INVENTION

The present invention relates to an electronic key system for controlling locking and unlocking of vehicle doors, starting of a vehicle engine, and the like in response to an ID code signal transmitted from a portable electronic key.

BACKGROUND OF THE INVENTION

In an electronic key system of a vehicle, a transmitter in a vehicle transmits an interrogatory signal toward a predetermined detection area at every fixed time interval. When a vehicle user having a portable electronic key comes in the detection area, the electronic key transmits its identification (ID) code signal in response to the interrogatory signal. If the ID code agrees to an ID code assigned to the vehicle, a door lock control system in the vehicle drives its doors to an unlocking standby condition. The doors are unlocked electronically when a touch sensor detects that the user touches or manipulates a door handle.

The electronic key has a built-in battery to be operable to receive the interrogatory signal and transmit the ID code signal. The electronic key also has a mechanical key so that the vehicle doors may be unlocked by the mechanical key and door key cylinders when the electronic key becomes inoperable due to rundown of its built-in battery. Further, an immobilizer composed of a coil antenna and electronic circuits is provided in the vehicle to enable starting of the engine with the mechanical key by retrieving the ID code from the electronic key. The coil antenna is incorporated in an engine key cylinder of the vehicle so that the coil antenna generates an induction voltage to transmit its ID code signal. Thus, the electronic key system needs various backup systems such as the mechanical key, the key cylinders and the immobilizer, complicating a system structure.

SUMMARY OF THE INVENTION

It is therefore an object of the present invention to provide an electronic key system capable of operating under a battery rundown condition without complicating a system structure.

According to the present invention, a portable device has a built-in battery for receiving an interrogatory signal and transmitting a code signal with an electric power of the built-in battery. A security control device transmits the interrogatory signal to the portable device, receives the code signal from the portable device and checks whether the code signal is a right one. The portable device and the security control device have LC resonance circuits including coils adapted to be electromagnetically coupled each other, respectively. The portable device has a power storing unit for storing an electric power induced by the LC resonance circuit of the portable device when the LC resonance circuit of the security control device resonates, thereby to receive the interrogatory signal and transmit the code signal with the electric power of the power storing unit. The coils of the portable device and the security control device is used as antennas of the portable device and the security control device for signal transmission and reception when the portable device is driven with the electric power of the power storing unit to transmit the code signal.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

An electronic key system is used for a vehicle as one embodiment of the invention to control a door locking/unlocking operation, a steering wheel locking/unlocking operation, engine starting enabling/disabling operation and the like by a two-way communication between a vehicle and an electronic key carried by a user (vehicle driver).

Figure 1:
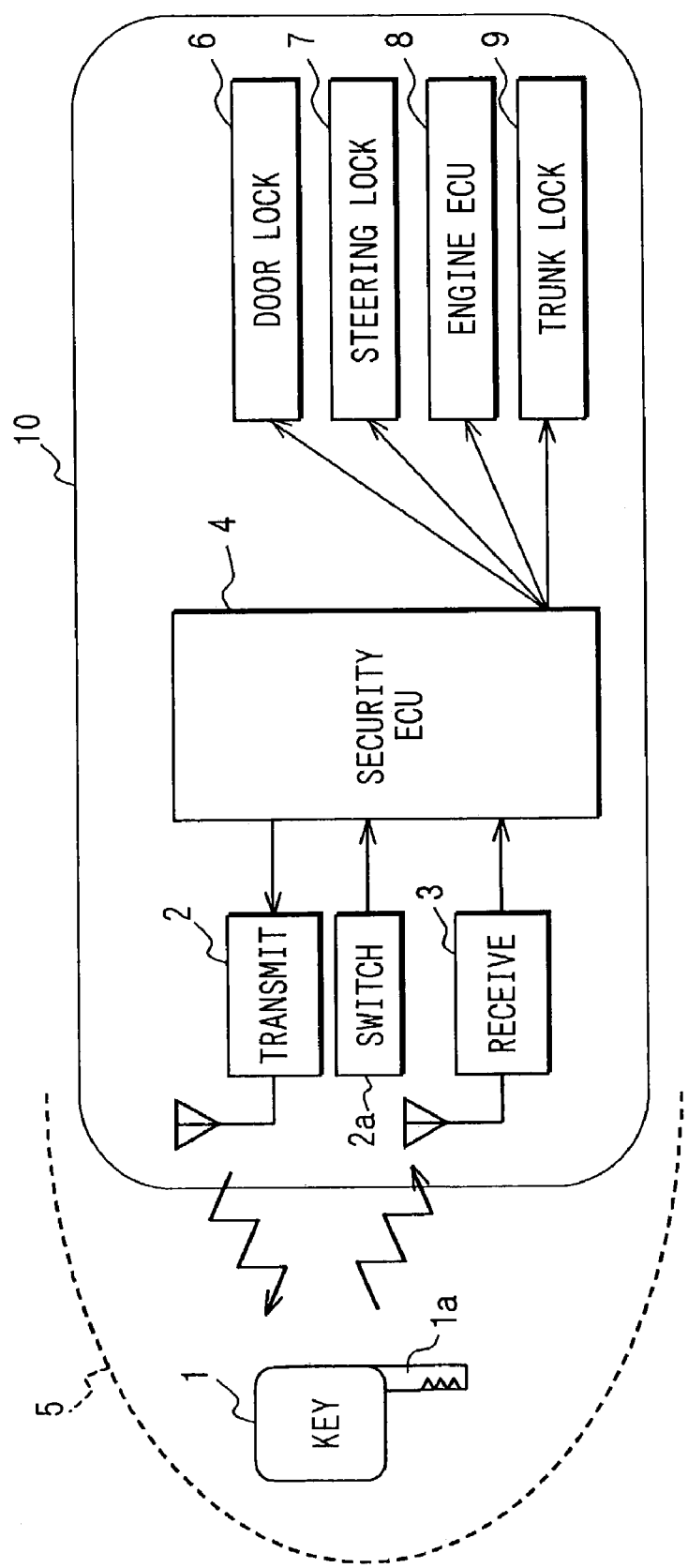
FIG. 1 is a schematic view of an electronic key system for a vehicle according to the present invention.

As shown in FIG. 1, an electronic key system has a wireless transmitter 2, a wireless receiver 3 and a security electronic control unit (ECU) 4 in a vehicle 10. The security ECU 4 is for controlling a door lock mechanism 6, a steering lock mechanism 7, an engine ECU 8 and a trunk lock mechanism 9 of the vehicle 10.

The transmitter 2 is provided at a number of predetermined locations in the vehicle 10, and transmits an interrogatory signal at a fixed time interval in response to an instruction from the security ECU 4. The interrogatory signal is limited to travel only a short distance, for instance, 0.7 meters to 1.0 meter, thereby defining a fixed detection area 5.

The electronic key system also has a portable electronic device (key) 1 carried by a user such as a vehicle driver. The electronic key is integrated with a mechanical key 1a. The electronic key 1 includes a transmitter circuit and a receiver circuit to receive the interrogatory signal transmitted from the transmitter 2 through an antenna and transmit in return an ID code signal of when the user approaches the vehicle and enters the detection area 5.

In the vehicle, the receiver 3 in the vehicle receives the ID code signal transmitted from the electronic key 1 through an antenna. The security ECU 4 checks whether the ID code coincides with a specific ID code assigned to each vehicle, whether the electronic key is an authorized one. The ECU 4 then drives the lock mechanisms 6, and 9 to the unlocking standby condition if the ID codes coincide each other. The security ECU 4 electronically and automatically unlocks vehicle doors when a touch sensor (not shown) detects a manipulation of a door handle by the user.

When the vehicle user gets in the vehicle, the transmitter 2 and the receiver 3 further execute a communication with the electronic key 1 within the vehicle 10 so that the ECU 4 may check again whether the ID codes coincide. If the ID codes coincide, the ECU 4 drives the steering lock mechanism 7 to an unlocking standby condition. When an engine operation switch (not shown) is turned on for engine starting, the ECU 4 unlocks the steering lock mechanism 7 and drives the engine ECU 8 to release engine starting prohibition. Thus, the user carrying the electronic key 1 is enabled to start the engine and drive the vehicle 10 without taking up and manually operating the electronic key 1.

When the user gets off the vehicle 10 and operates a door lock switch (not shown) provided near a door handle after stopping the vehicle 10 and turning off the engine operation switch, the doors of the vehicle 10 are locked. The engine ECU 8 is driven into the engine starting prohibition condition.

Figure 2:
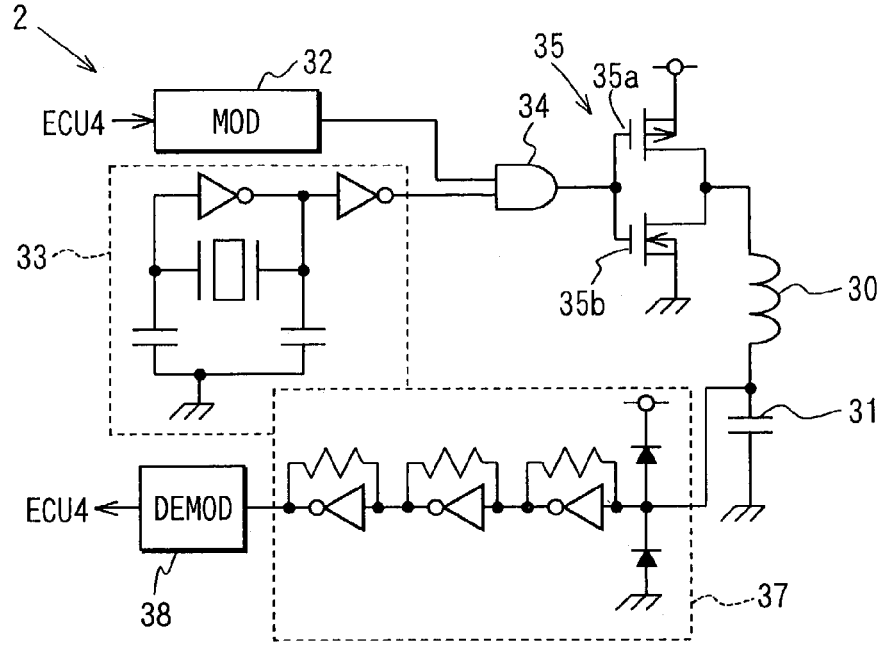
FIG. 2 is a circuit diagram of a transmitter mounted in a vehicle.

The transmitter 2 has, as shown in FIG. 2, a resonance circuit composed of an antenna coil 30 and a resonant capacitor 31. The transmitter 2 further has a modulation circuit 32, an oscillation circuit 33, an AND gate 34 and a drive circuit 35. The modulation circuit 32 generates a modulation signal including the interrogatory signal in response to a control signal from the security ECU 4. The AND gate 34 combines the modulation signal of the modulation circuit 32 and the oscillation signal of the oscillation circuit 33 and generates a transmission signal. This transmission signal is applied to the drive circuit 35, in which P-channel and N-channel field effect transistors (FETS) 35a and 35b are connected in a half-bridge configuration.

The antenna coil 30 is provided as a signal transmitting antenna for transmitting the interrogatory signal and as a signal receiving antenna for receiving the code signal. Therefore, the transmitter 2 also has an amplifier circuit 37 and a demodulation circuit 38, which is connected to the security ECU 4. Thus, the circuits 37 and 38 operate as the receiver circuit 3 shown in FIG. 1 with the antenna coil 30.

Figure 3:
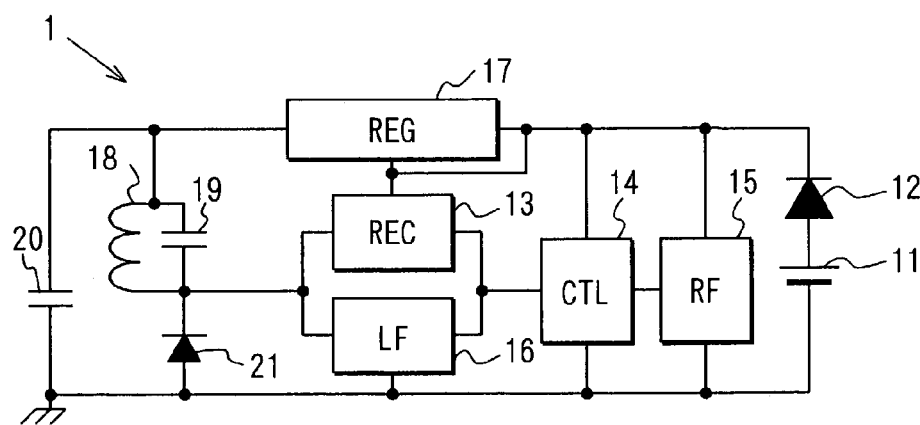
FIG. 3 is a circuit diagram of a electronic key carried by a vehicle user.

The electronic key 1 has, as shown in FIG. 3, has a built-in battery 11, a diode 12 and a resonance circuit composed of an antenna coil 18 and a resonant capacitor 19. The antenna coil 18 is constructed to be electromagnetically coupled with the antenna coil 30 of the transmitter 2, when the electronic key 1 is placed at a predetermined nearby position of the transmitter 2. The electronic key 1 also has a charge capacitor 20 and a diode 21, both being connected to the resonance circuit of the coil 18 and the capacitor 19. When the antenna coil 18 is electromagnetically coupled with the antenna coil 30, the resonance circuit of the electronic key 1 generates a.c. current. The diode 21 rectifies the a.c. current and charges the charge capacitor 20.

The electronic key 1 further has a receiver circuit 13, a control circuit 14, a radio frequency (RF) circuit 15, a low frequency (LF) transmission circuit 16 and a regulator circuit 17. The receiver circuit 13 receives and demodulates the interrogatory signal received by the antenna coil 18. The control circuit 14 generates a control signal for transmitting the ID code signal including an ID code specific to each electronic key in response the demodulated interrogatory signal. Specifically, the ID code is modulated by the RF transmission circuit 15 or the LF transmission circuit 16 into the ID code signal and is transmitted to the transmitter 2, which also operates as the receiver 3 as shown in FIG. 2.

Figure 4:
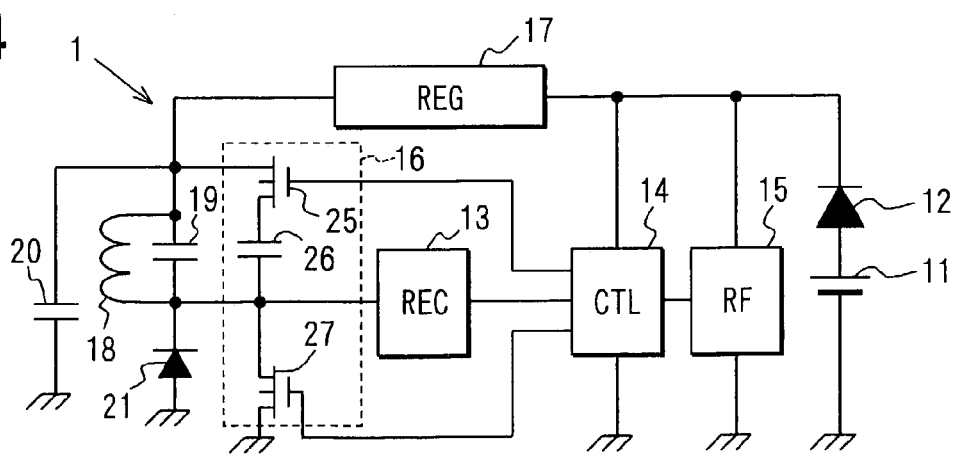
FIG. 4 is a circuit diagram of a LF transmission circuit used in the electronic key shown in FIG. 3.

The LF transmission circuit 16 has, as shown in FIG. 4, a field effect transistor (FET) 27 connected in series with the resonance circuit (coil 18 and capacitor 19). The LF transmission circuit 16 also has a capacitor 26 and a FET 25 connected in series with the capacitor 26. This series circuit is connected in parallel with the resonance circuit.

The FET 27 is turned on and off at a fixed frequency by the control circuit 14 to cause resonant oscillation of the resonance circuit. During the resonant oscillation of the resonance circuit, the FET 25 is turned on and off by a control signal from the control circuit 14 so that the frequency of the resonant oscillation is varied by the control signal. By varying the control signal in accordance with the ID code assigned to each electronic key, a frequency-modulated signal is transmitted as the ID code signal from the antenna coil 18. It is also possible to vary the time width of the control signal applied to the FET 27 in accordance with the ID code so that the ID code signal is transmitted as a pulse width-modulated signal.

The regulator circuit 17 regulates a voltage of the charge capacitor 20 charged by the battery 11 and supplies it to the circuits 14 and 15 when the battery 11 runs down. The diode 12 blocks an electric current from flowing in reverse from the charge capacitor 20 to the battery 11, when the battery 11 runs down.

In operation, in the transmitter 2 of the vehicle 10, the modulation circuit 32 generates the modulation signal indicative of the interrogatory signal in response to an instruction from the security ECU 4. This modulation signal is a pulse width-modulated pulse signal that is formed by combining high level signals and low level signals in correspondence with a code signal indicative of the interrogatory signal.

This pulse width-modulated signal and the oscillation signal of a fixed frequency used as a carrier wave are combined by the AND gate 34 to produce the transmission signal. This transmission signal is output to the drive circuit 35 to turn on and off the FETs 35a and 35b. The antenna coil 30 and the resonant capacitor 31 are connected to a power source (not shown) when the FET 35a is turned on and the FET 35b is turned off. On the contrary, the antenna coil 30 and the capacitor 31 are disconnected from the power source and grounded when the FET 35a is turned off and the FET 35b is turned on.

Thus, the antenna coil 30 and the resonant capacitor 31 resonate and an alternating (a.c.) current flows in the antenna coil 30. As a result, an electric wave is transmitted from the antenna coil 30 at the frequency of the a.c. current as the interrogatory signal.

When the battery 11 of the electronic key 1 has a sufficient capacity to supply electric power to the circuits 12, 14 and 15, the receiver circuit 13 receives the interrogatory signal through the antenna 18 in the detection area 5. The control circuit 14 responsively causes the RF transmission circuit 15 to modulate the ID code of the electronic key 1 by the radio frequency signal of a MHz band and transmit the resulting ID code signal to the wireless receiver 3. The security ECU 4 of the vehicle 10 controls the lock mechanisms and the engine ECU 6 to 7 to enable automatic unlocking without using the mechanical key 1a of the electronic key 1 if the ID code included in the ID code signal is the specified code.

If the built-in battery 11 of the electronic key 1 runs down, the electronic key 1 becomes incapable of radio signal receiving and transmitting operations. Therefore, the user unlocks the vehicle door by using the mechanical key 1 in the conventional manner to get in the vehicle. When the user places the electronic key 1 at the predetermined position in the vehicle 10, for instance in a key slot (not shown) provided near the transmitter 2, the antenna coils 30 and 18 are electromagnetically coupled. The key slot preferably includes a push switch 2a that detects an insertion of the electronic key 1 in the key slot and produces a key detection signal to the security ECU 4.

In response to the key detection signal, the security ECU 4 causes the modulation circuit 32 to produce a high level signal thereby allowing the AND gate 34 to pass the oscillation signal of the oscillation circuit 33 to the drive circuit 35. The FETs 35*a* and 35*b* are turned on and off alternately so that the antenna coil 30 and the resonant capacitor 31 resonate. The antenna coil 30 thus generates a varying magnetic field based on this resonance.

Due to the varying magnetic field, the antenna coil 18 induces an a.c. voltage at the same frequency as the resonant frequency of the antenna coil 30. This a.c. voltage is rectified by the diode 21 and charges the charge capacitor 20. The charging may preferably be continued for a period of 50 ms to 100 ms. Since the capacitor 20 thus charged supplies an electric power to the receiver circuit 13, the receiver circuit 13 may be maintained operable to receive the interrogatory signal from the transmitter 2 even when the built-in battery 11 is not capable of supplying the electric power.

Specifically, after the charging operation of about 50 ms to 100 ms, the security ECU 4 instructs the modulation circuit 32 to produce the pulse width-modulated signal corresponding to the interrogatory signal. This modulation signal causes a resonance of the antenna coil 30 and the resonant capacitor 31.

Since the antenna coil 30 of the transmitter 2 and the antenna coil 18 of the electronic key 1 are electromagnetically coupled, the resonance of the coil 30 and the capacitor 31 is transmitted to the resonance circuit of the antenna coil 18 and the resonant capacitor 19 by way of not the electric wave but the magnetic field. The coil 18 and the capacitor 19 also resonate. As the receiver circuit 13 is supplied with the electric power from the charge capacitor 20 at this time, the receiver circuit 13 is capable of demodulating the interrogatory signal from the resonance signal of the coil 18 and the capacitor 19. The control circuit 14 instructs the LF transmission circuit 16 to generate the ID code signal as a response to the interrogatory signal.

It is noted that the LF transmission circuit 16 is used to transmit ID code signal when the built-in battery runs down, although the RF transmission circuit 15*is* normally used to transmit the ID code signal. Since the RF transmission circuit 15 consumes more electric power for transmitting the ID code signal in the high frequency band, the charge capacitor 20 is necessarily required to have a larger power storing capacity and size and is required to be charged for a longer period of time. For this reason, the LF transmission circuit 16 is used in correspondence with the low frequency resonance (for instance several hundreds of KHz) of the antenna coil 18. Thus, the electric power required to transmit the ID code signal from the electronic key 1 is reduced when the battery 11 runs down.

When LF transmission circuit 16 causes the antenna coil 18 and the resonant capacitor 19 to resonate for transmitting the ID code signal, the FETs 35*a* and 35*b* are turned off and on, respectively, so that the antenna coil 30 and the resonant capacitor 31 are connected in parallel. The coil 30 and the capacitor 31 resonate as a parallel resonance circuit when the ID code signal is transmitted from the antenna coil 18 of the electronic key 1 by way of a magnetic field. The amplifier circuit 37 and the demodulation circuit 38 demodulate the resonance signal and applies the ID code signal to the security ECU 4. As a result, the security ECU 4 is enabled to compare the ID indicated by the ID code signal with the prestored ID code, thereby enabling or disabling the engine starting operation in response to the ID comparison result.

In the above embodiment, it is possible to use a rechargeable battery in place of the built-in battery 11 and recharge this battery with the voltage induced in the antenna coil 18 when electromagnetically coupled with the antenna coil 30. In this case, the charge capacitor 20 and the diode 21 need not be used. If the built-in battery of the electronic key is rechargeable, the electronic key system can be used as a keyless entry system.

The above embodiment may also be modified to an electronic key system or a keyless entry system for homes, offices and the like.

What is claimed is:

1. An electronic key system comprising:
    a portable device having a built-in battery for receiving an interrogatory signal and transmitting a code signal with an electric power of the built-in battery; and
    a security control means for transmitting the interrogatory signal to the portable device, receiving the code signal from the portable device and checking whether the code signal is a right one, wherein:
    the portable device and the security control means have LC resonance circuits including coils adapted to be electromagnetically coupled each other, respectively,
    the portable device has a power storing means for storing an electric power induced by the LC resonance circuit of the portable device when the LC resonance circuit of the security control means resonates, thereby to receive the interrogatory signal and transmit the code signal with the electric power of the power storing means, and
    the coils of the portable device and the security control means is used antennas of the portable device and the security control means for signal transmission and reception when the portable device is driven with the electric power of the power storing means to transmit the code signal;
    the portable device includes a radio frequency transmission circuit that transmits the code signal in a radio frequency when the built-in battery is operative, and a low frequency transmission circuit that transmits the code signal in a low frequency lower than the radio frequency when the built-in battery is inoperative;
    the low frequency transmission circuit includes a capacitor and two switching devices connected in series with the capacitor at both sides of the capacitor, and
    a series circuit of the capacitor and one of the switching devices is connected in parallel with the resonance circuit of the portable device.

2. The electronic key system as in claim 1, wherein the security control means is provided in a vehicle and includes a door lock mechanism that controls locking and unlocking of a door of the vehicle in response to the code signal transmitted from the portable device.

3. The electronic key system as in claim 1, wherein the portable device transmits the code signal in response to the interrogatory signal from the security control means.

4. The electronic key system as in claim 1, wherein the built-in battery is rechargeable and used as the power storing means.

5. The electronic key system as in claim 4, wherein the security control means is provided in a vehicle and includes a door lock mechanism that controls locking and unlocking of a door of the vehicle in response to the code signal transmitted from the portable device.

6. The electronic key system as in claim 4, wherein the portable device transmits the code signal in response to the interrogatory signal from the security control means.

7. The electronic key system as in claim 1, wherein the portable device has a diode connected in series with the resonance circuit of the portable device to rectify the electric power charged from the LC resonance circuit of the portable device to the power storing means.

8. The electronic key system as in claim 1, wherein the resonance circuit of the security control means includes a resonant capacitor and the coil connected in series with each other, and wherein the security control means includes a pair of switching devices connected to the resonance circuit of the security control means and turned on and off alternately.

* * * * *